(12) United States Patent
Lafargue et al.

(10) Patent No.: US 11,391,203 B2
(45) Date of Patent: Jul. 19, 2022

(54) ASYMMETRIC PROPULSION SYSTEM WITH HEAT RECOVERY

(71) Applicant: SAFRAN HELICOPTER ENGINES, Bordes (FR)

(72) Inventors: Olivier Audrey David Lafargue, Moissy-Cramayel (FR); Thomas Klonowski, Moissy-Cramayel (FR); Antoine Pascal Moutaux, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/972,870

(22) PCT Filed: Jun. 7, 2019

(86) PCT No.: PCT/FR2019/051374
§ 371 (c)(1),
(2) Date: Dec. 7, 2020

(87) PCT Pub. No.: WO2019/234368
PCT Pub. Date: Dec. 12, 2019

(65) Prior Publication Data
US 2021/0246827 A1    Aug. 12, 2021

(30) Foreign Application Priority Data

Jun. 7, 2018 (FR) ...................................... 1854949

(51) Int. Cl.
*F02C 6/02* (2006.01)
*F02C 7/10* (2006.01)
(Continued)

(52) U.S. Cl.
CPC .................. *F02C 6/02* (2013.01); *F02C 7/10* (2013.01); *F02C 7/36* (2013.01); *F02C 9/42* (2013.01);
(Continued)

(58) Field of Classification Search
CPC ...... F02C 6/02; F02C 6/10; F02C 7/10; F05D 2270/13
See application file for complete search history.

(56) References Cited

U.S. PATENT DOCUMENTS 3,621,654 A * 11/1971 Hull .......................... F02C 7/08
60/407
4,197,699 A   4/1980 Parker et al.
(Continued)

FOREIGN PATENT DOCUMENTS

FR        2962488 A1    1/2012
WO    2013/160590 A1   10/2013
(Continued)

OTHER PUBLICATIONS

International Search Report and Written Opinion received for PCT Patent Application No. PCT/FR2019/051374, dated Oct. 9, 2019, 20 pages (9 pages of English Translation and 11 pages of Original Document).

*Primary Examiner* — Katheryn A Malatek
(74) *Attorney, Agent, or Firm* — Womble Bond Dickinson (US) LLP

(57) ABSTRACT

The invention relates to an aircraft propulsion system, comprising a main transmission unit (12) and at least two turbojet engines connected to the main transmission unit (12), respectively a first turbojet engine (14a) and a second turbojet engine (14b), each turbojet engine comprising a free turbine (24a, 24b), characterized in that the first turbojet engine (14a) comprises a heat exchanger (30) configured to recover some of the thermal energy from the exhaust gas at
(Continued)

Figure 1A:
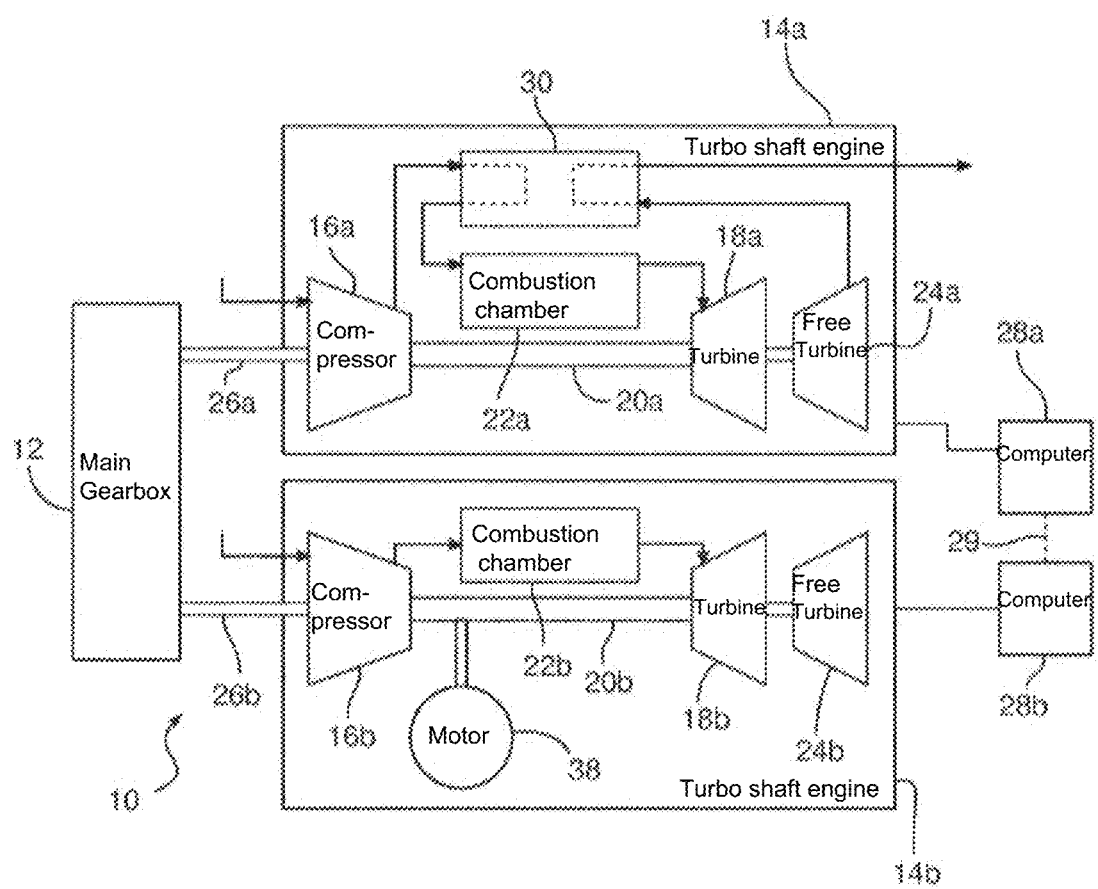

the outlet of the free turbine, and in that the propulsion system comprises at least one computer (28*a*, 28*b*) configured to control the two turbojet engines and to limit the acceleration and the deceleration of the first turbojet engine (14*a*) when neither of the turbojet engines is broken down, in order to limit the reactor power transients at the heat exchanger (30).

11 Claims, 7 Drawing Sheets

(51) Int. Cl.
  *F02C 7/36* (2006.01)
  *F02C 9/42* (2006.01)

(52) U.S. Cl.
  CPC .... *F05D 2220/60* (2013.01); *F05D 2260/213* (2013.01); *F05D 2260/40* (2013.01); *F05D 2270/04* (2013.01); *F05D 2270/13* (2013.01)

(56) References Cited

U.S. PATENT DOCUMENTS

| | | | |
|---|---|---|---|
| 4,644,744 A | 2/1987 | Mittendorf et al. | |
| 6,698,181 B2* | 3/2004 | Certain | B64D 31/06 60/39.281 |
| 9,355,571 B2* | 5/2016 | Rucci | B62D 1/22 |
| 2002/0029559 A1* | 3/2002 | Mandai | F02C 3/36 60/39.511 |
| 2003/0094001 A1 | 5/2003 | Desai et al. | |
| 2004/0112037 A1* | 6/2004 | Yagi | F02C 7/10 60/39.3 |
| 2010/0257837 A1* | 10/2010 | Schroder | F02C 7/10 60/39.15 |
| 2012/0324903 A1* | 12/2012 | Dewis | F01D 15/02 60/801 |
| 2013/0139519 A1* | 6/2013 | Kesseli | F02C 9/26 60/773 |
| 2015/0176488 A1* | 6/2015 | Borchers | B64C 27/12 60/773 |
| 2016/0003144 A1 | 1/2016 | Kupratis | |
| 2016/0047310 A1* | 2/2016 | Tanimura | F01D 19/02 60/39.511 |
| 2016/0311548 A1* | 10/2016 | Thiriet | F02C 6/206 |
| 2016/0369695 A1* | 12/2016 | Perlak | F02C 7/10 |
| 2018/0073437 A1* | 3/2018 | Simonetti | F01D 13/00 |
| 2018/0080378 A1* | 3/2018 | Alecu | F02C 9/42 |

FOREIGN PATENT DOCUMENTS

| | | |
|---|---|---|
| WO | 2015/145031 A1 | 10/2015 |
| WO | 2015/145042 A1 | 10/2015 |

* cited by examiner

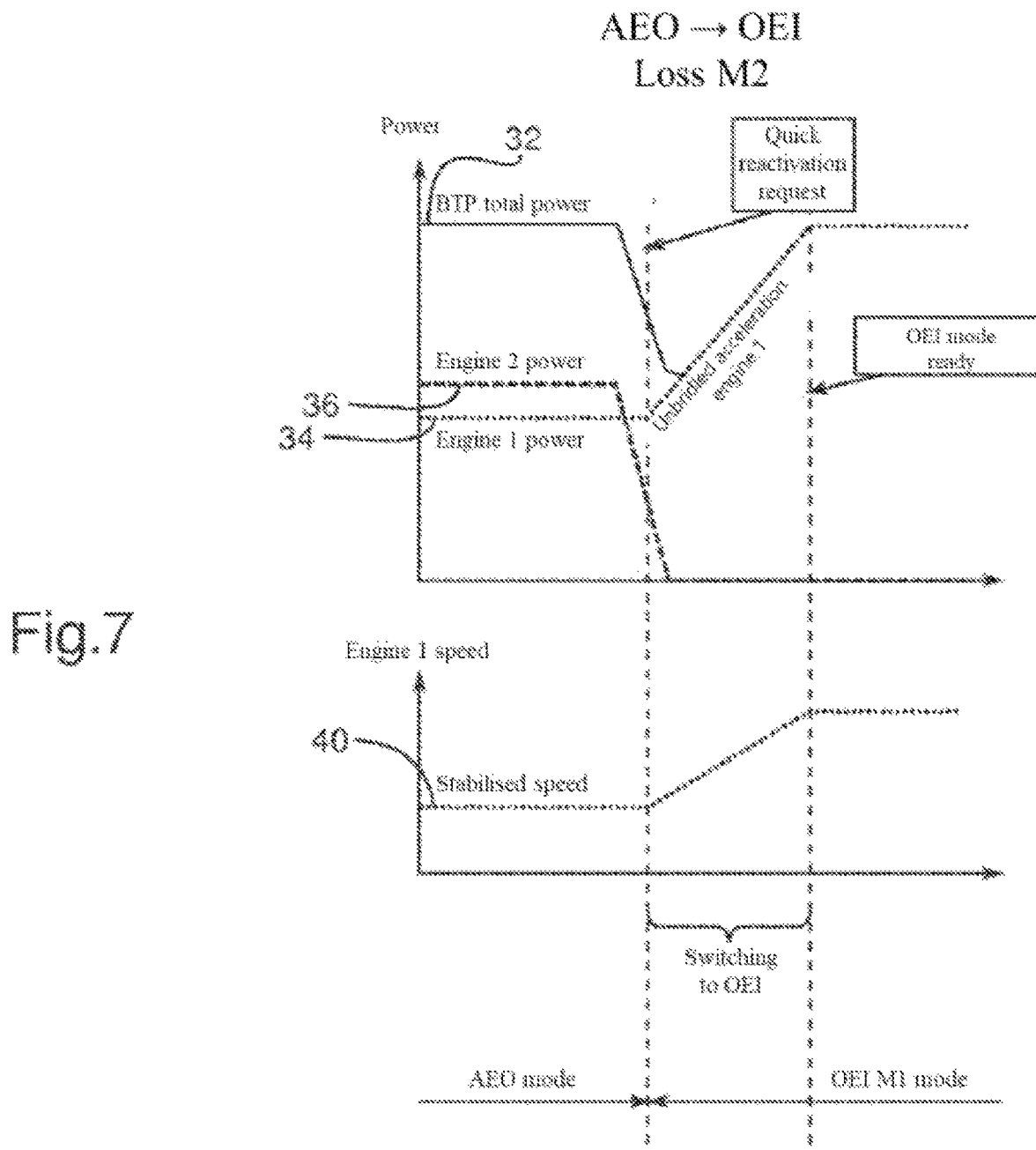

ASYMMETRIC PROPULSION SYSTEM WITH HEAT RECOVERY

1. TECHNICAL FIELD OF THE INVENTION

The invention relates to a propulsion system of an aircraft. In particular, the invention relates to a propulsion system of an aircraft, comprising at least two turboshaft engines connected to a main gearbox, typically in a twin-engine or multi-engine helicopter.

2. BACKGROUND

The prior art comprises in particular the documents US-A1-2016/003144, FR-A1-2 962 488, U.S. Pat. No. 4,644,744, US-A1-2003/094001 and U.S. Pat. No. 4,197,699.

In a known manner, twin-engine or multi-engine helicopters have a propulsion system comprising two, three or more turboshaft engines, each turboshaft engine comprising a gas generator and a free turbine driven in rotation by the gas generator and attached to an output shaft. The output shaft of each free turbine is adapted to set in motion a power gearbox (hereinafter referred to as BTP), which itself drives the rotor of the helicopter equipped with variable pitch blades. The gas generator comprises at least one compressor and at least one turbine connected by a shaft, and a combustor receiving air compressed by the compressor and burning an air/fuel mixture to form a gas transmitted to the gas generator turbine and the free turbine.

At the outlet of the free turbine, an exhaust nozzle allows the evacuation of the outlet gases, called exhaust gas. These exhaust gases are at high temperature. It was thus envisaged to recover part of the thermal energy from these exhaust gases, in particular thanks to a heat exchanger. In particular, a heat exchanger can be used to use the thermal energy of the exhaust gases to heat the air entering the combustion chamber at the outlet of the compressor. A turboshaft engine equipped with such a heat exchanger is called a recuperative cycle turboshaft engine. Such a turboshaft engine is therefore more energy efficient.

However, the exchangers currently used in the turboshaft engines of today's propulsion systems are subject to thermal cycles due to rapid (transient) power variations, which cause strong thermal and mechanical stresses. In particular, the thermal and mechanical stresses due to these transients require adequate sizing and mechanical strength of the exchanger to limit its degradation. The exchanger is thus penalized because it is less efficient, heavy and expensive, and the turboshaft engine is therefore less competitive than a turboshaft engine without an exchanger.

The inventors therefore sought a way to use an exchanger in a propulsion system so that it would be competitive with existing propulsion systems.

3. OBJECTIVES OF THE INVENTION

The invention is intended to overcome at least some of the disadvantages of known propulsion systems.

In particular, the invention aims at providing, in at least one embodiment of the invention, a propulsion system allowing to recover part of the thermal energy of the exhaust gases.

The invention also aims at providing, in at least one embodiment, a propulsion system that does not require an oversized exchanger to resist the stresses generated by the transients of turboshaft engines. Thus, the invention aims to provide, in at least one embodiment, a propulsion system in which the thermal and mechanical stresses generated by the transients of a turboshaft engine in the heat exchanger associated with it are limited.

The invention also aims at providing, in at least one embodiment of the invention, a high-performance propulsion system.

The invention also aims to provide, in at least one embodiment, a propulsion system capable of managing transient phases with at least the same efficiency as a conventional propulsion system.

The invention also aims to provide, in at least one embodiment, a propulsion system operating in the event of failure of one of the turboshaft engines.

4. STATEMENT OF THE INVENTION

For this purpose, the invention relates to a propulsion system of an aircraft, comprising a main gearbox and at least two turboshaft engines connected to the main gearbox, respectively a first turboshaft engine and a second turboshaft engine, each turboshaft engine comprising a free turbine, wherein the first turboshaft engine comprises a heat exchanger configured to recover part of the thermal energy from the exhaust gases exiting the free turbine, and the propulsion system comprises at least one computer, configured to control the two turboshaft engines and to limit the acceleration and deceleration of the first turboshaft engine when neither of the turboshaft engines is broken down, so as to limit power transients at the heat exchanger.

A propulsion system according to the invention thus makes it possible to take advantage of the presence of at least two turboshaft engines so that one of them (the first turboshaft engine) is equipped with a heat exchanger, in return for limiting its acceleration and deceleration so as not to cause significant power transients at the heat exchanger, and so that the other turboshaft engine (the second turboshaft engine) meets the remaining needs while operating normally, without limitation of acceleration/deceleration. If the second turboshaft engine is equipped with a heat exchanger, this one will undergo the degradations evoked previously, thus the second turboshaft engine is preferably not equipped with a heat exchanger.

Thus, the first turboshaft engine can be used at an almost constant power level to supply part of the propulsive energy required by the aircraft, for example between 50% and 100% of the propulsive energy in cruise mode, preferably around 70% of the propulsive energy in cruise mode. The second turboshaft engine will provide the necessary power, either to achieve the propulsive energy at cruise power or to meet additional punctual energy requirements (helicopter maneuvering, load lifting, etc.).

In the event of a failure of the first turboshaft engine, the second turboshaft engine will take over and provide all the power needed to extend the flight or enable an emergency landing. Because of the failure, the deceleration of the first turboshaft engine is no longer controlled by the computer.

In the event of a failure of the second turboshaft engine, the computer stops limiting the acceleration and deceleration of the first turboshaft engine so that the first turboshaft engine can provide all the power required, even in the event of additional punctual power requirements, in order to guarantee the integrity of the aircraft and the safety of its occupants (by avoiding an accident). This limitation is to the detriment of the exchanger, which can be degraded more quickly in this critical case.

Turboshaft engines are of the type described above comprising a gas generator and a free turbine. Preferably, the exchanger recovers the exhaust gases at the free turbine outlet, and heats the gas leaving the compressor before it enters the combustion chamber.

The propulsion system can comprise more than two turboshaft engines, as long as it comprises at least one turboshaft engine with an exchanger with limited acceleration/deceleration and at least a second "conventional" turboshaft engine without an exchanger. The other turboshaft engines are either with an exchanger like the first turboshaft engine or without an exchanger like the second turboshaft engine.

Advantageously and according to the invention, the acceleration and deceleration limits imposed by the computer on the first turboshaft engine, when none of the turboshaft engines has failed, can be predefined as a function of the heat exchanger so as to limit the thermal and mechanical stresses in the latter.

Advantageously and according to the invention, the acceleration and deceleration limits can be predefined as a function of the dimensioning and mechanical strength of the heat exchanger.

Advantageously and according to the invention, the acceleration and deceleration limits predefined as a function of the heat exchanger can be lower than the physical acceleration and deceleration limits of the first turboshaft engine, and the heat exchanger is unable to withstand without degradation the power transients corresponding to said physical limits.

The physical acceleration and deceleration limits of the turboshaft engine are physical limits of operability of the turboshaft engine during transients. In a manner known per se, these physical limits translate into acceleration and deceleration stops which are imposed by the computer. Beyond these physical acceleration and deceleration limits, the turboshaft engine is no longer operable. The operability of the turboshaft engine is its ability to manage the transients, and in particular its ability to accelerate and decelerate the turboshaft engine while managing the acceleration and deceleration limits.

The computer of the propulsion system according to the invention can use, in a manner known per se, acceleration and deceleration stops to prevent pumping or shutdown of a turboshaft engine. Classically, curves including a stabilized operating line and a pumping line characterize the relationship between a compression ratio and a reduced mass flow rate of gases in a compressor of a turboshaft engine. On a graph representing this relationship, the stabilized operating line is located below the pumping line, and each line forms an increasing curve.

During transients, the acceleration line of the turboshaft engine and the deceleration line of the turboshaft engine deviate above and below the stabilized operating line, respectively. In order not to risk pumping during rapid acceleration of the turboshaft engine, the acceleration line must remain between the stabilised operating line and the pumping line, leaving a certain margin below the pumping line. This margin is due to the fact that the ordinate position of the pumping line, on the graph linking the compression ratio to the reduced mass flow rate, can vary in particular with the ageing or the deterioration of the engine, and moreover this position is not necessarily the same for two identical engines due to manufacturing distortions or dispersions. An acceleration stop $dN/dt$ is generally defined as corresponding to a line, usually a straight line, maintaining a margin greater than or equal to a predefined minimum margin with respect to the pumping line. Thus, during transients, the acceleration line can reach the acceleration stop, but does not encroach on the pumping margin.

Similarly, on the graph linking the compression ratio to the reduced mass flow rate, the deceleration line of the turboshaft engine must remain between the stabilised operating line and a shutdown line of the combustion chamber of the turboshaft engine. A deceleration stop is usually defined so that during rapid deceleration of the turboshaft engine, the deceleration line remains sufficiently above the shutdown line.

The computer can therefore impose acceleration and deceleration stops on the first turboshaft engine that correspond to the physical acceleration and deceleration limits beyond which the turboshaft engine may pump or shutdown. Advantageously and according to the invention, the acceleration and deceleration limits provided to limit the power transients at the heat exchanger are lower than said acceleration and deceleration stops.

Advantageously and according to the invention, the propulsion system comprises an electric motor connected to the second turboshaft engine and configured to assist the second turboshaft engine during an acceleration, starting and/or standby exit phase.

According to this aspect of the invention, the electric motor allows the second turboshaft engine to be assisted during transient phases. In particular, several assistances are possible, the motor can be configured to provide one or more of them:

acceleration/deceleration assistance: since the second turboshaft engine is the only one to provide transients and sudden variations in energy demand, the electric motor can allow the second turboshaft engine to accelerate/decelerate more than it is capable of doing alone;

starting or standby exit assistance: in situations where the first turboshaft engine can provide the propulsive power alone, the second turboshaft engine can be switched off or in standby, according to several possible configurations. The electric motor can thus, in the event of an increase in the energy required by the aircraft or in the event of a failure of the first turboshaft engine, quickly restart or exit of standby the second turboshaft engine. In particular, if the first turboshaft engine fails, the second turboshaft engine must be able to supply power quickly enough so as not to endanger the aircraft and its occupants. Conventional starting of the second turboshaft engine without assistance may not be fast enough for these critical situations. For example, a power-assisted startup or standby exit may be performed in one-third of the time without assistance (e.g. 10 seconds for a power-assisted startup/standby exit versus 30 seconds for a conventional startup/standby exit).

The different shutdown or standby modes of the second turboshaft engine are for example:

a complete shutdown of the combustion chamber and a shutdown of the rotating shafts. In this mode, fuel consumption is zero, but starting may take a considerable amount of time, which is not compatible with a possible need for a quick start following the sudden loss of the other turboshaft engine;

a complete shutdown of the combustion chamber and a switch to "turning" mode, i.e. the shafts remain in rotation. In this mode, the electric motor drives the gas generator at a speed of about 10% of the nominal operating speed, allowing significant gains in emergency re-ignition time with zero fuel consumption;

a partial extinction of the combustion chamber and a setting in "super-idling" mode. In this mode, the gas generator is driven partly by the combustion of gas and fuel in the combustion chamber and partly by the electric motor. It consumes little fuel but allows very fast reactivation.

The first mode is considered a shutdown and the other two modes are considered standby, according to two different levels. Preferably, the second mode is implemented in the invention during the standby of the second turbo-shaft engine.

Turboshaft engines are of the type described above comprising a gas generator and a free turbine. The electric motor added to the second turboshaft engine drives the shaft of the gas generator.

Advantageously and according to the invention, each turboshaft engine comprises:
  a gas generator comprising a compressor and a turbine connected by a shaft, and a combustion chamber receiving air compressed by the compressor and burning an air/fuel mixture to form a gas transmitted to the turbine of the gas generator,
  the free turbine driven in rotation by the gas generator and integral with an output shaft, said output shaft being connected to the main gearbox,
and the heat exchanger is configured to heat the air compressed by the compressor of the first turboshaft engine via the recovered thermal energy portion.

Advantageously and according to the invention, each turboshaft engine comprises an exhaust nozzle, the heat exchanger being configured to recover part of the thermal energy from the exhaust gases at the exhaust nozzle of the first turboshaft engine.

Advantageously and according to the invention, the heat exchanger is configured to recover part of the thermal energy from the exhaust gases of both turboshaft engines.

The invention also relates to a propulsion system of an aircraft, comprising a main gearbox and N turboshaft engines connected to the main gearbox, N being an integer greater than or equal to 3, each turboshaft engine comprising a free turbine,
  characterized in that at least one turboshaft engine among the N turboshaft engines, referred to as the first turboshaft engine, comprises a heat exchanger configured to recover part of the thermal energy from the exhaust gases exiting the free turbine,
  and in that the propulsion system comprises at least one computer, configured to control the N turboshaft engines and to limit the acceleration and deceleration of said first turboshaft engine when none of the N turboshaft engines is broken down, so as to limit power transients at the heat exchanger.

Advantageously and according to the invention, the propulsion system comprises an electric motor connected to at least one other turboshaft engine, referred to as the second turboshaft engine, and configured to assist said second turboshaft engine during an acceleration, starting and/or standby exit phase.

Advantageously and according to the invention, the heat exchanger is configured to recover part of the thermal energy from the exhaust gases of each turboshaft engine.

The invention also relates to a method for managing a propulsion system according to the invention, characterized in that it comprises the following steps:
  a step of controlling the energy supplied by the first turboshaft engine and the second turboshaft engine so as to ensure the propulsive energy requirements,
  during a cruise flight of the aircraft, a shutdown or standby step of the second turboshaft engine, so that the first turboshaft engine provides all the propulsive energy,
  a restart or standby exit step for the second turboshaft engine if it is shut down or in standby mode and the energy supplied by the first turboshaft engine is no longer sufficient to meet the propulsive energy requirements.

A method according to the invention therefore allows the propulsion system to be used in cruise flight in "single engine operative" (also called SEO) with the first turboshaft engine. In the event of a failure or additional power requirement, the second turboshaft engine is back in operation (restarted or standby exit).

Preferably, the restart or standby exit step comprises an assistance step with an electric motor connected to the second turboshaft engine.

Assistance via an electric motor ensures that the time required for the second engine to be operational is limited, especially in an emergency.

The invention also concerns a propulsion system and a management method characterized in combination by all or part of the characteristics mentioned above or below.

5. LIST OF FIGURES

Figure 2:
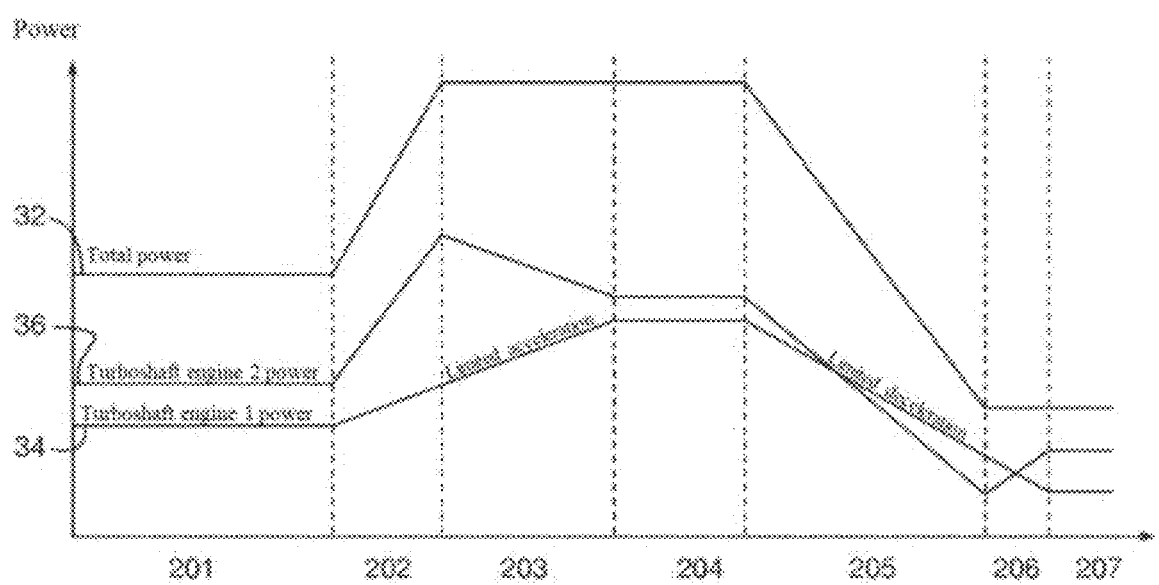
Figure 1B:
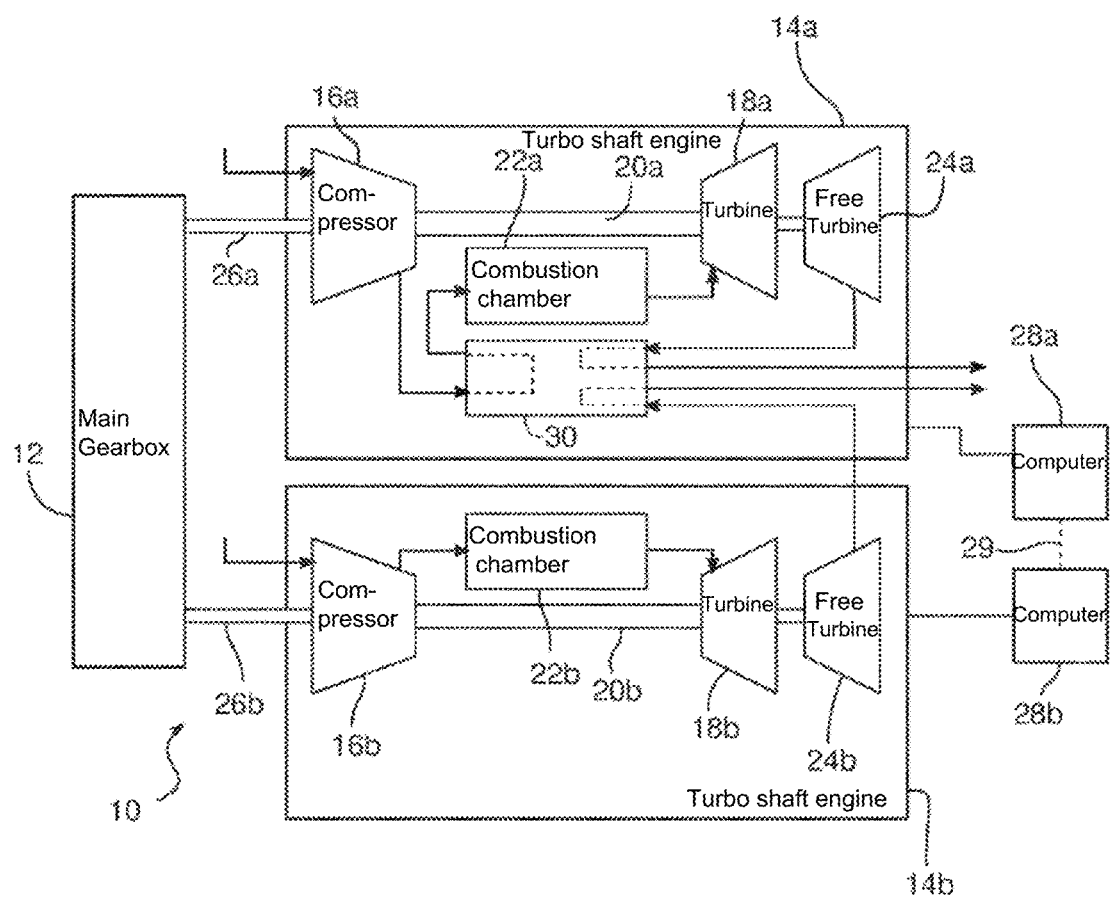
Figure 3:
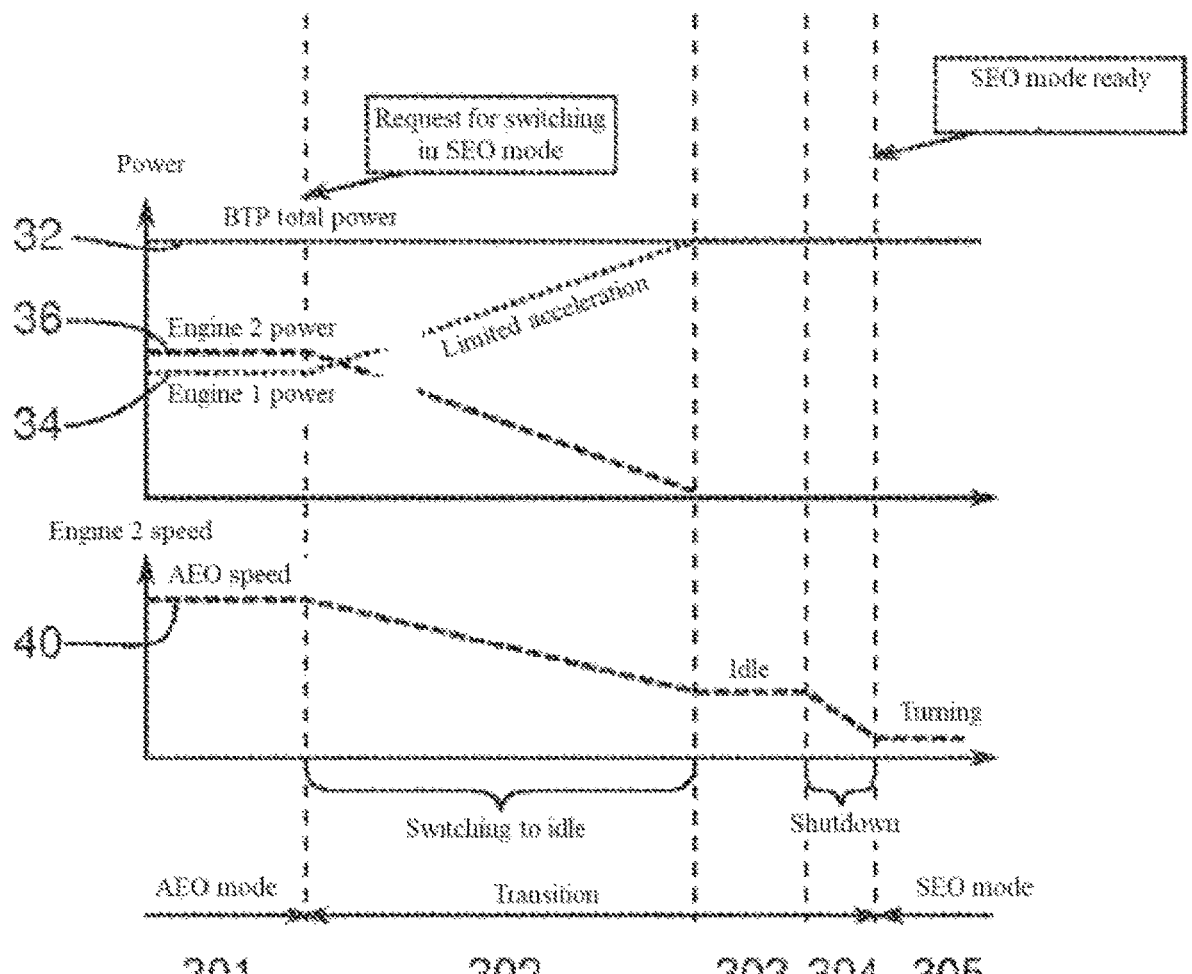
Figure 4:
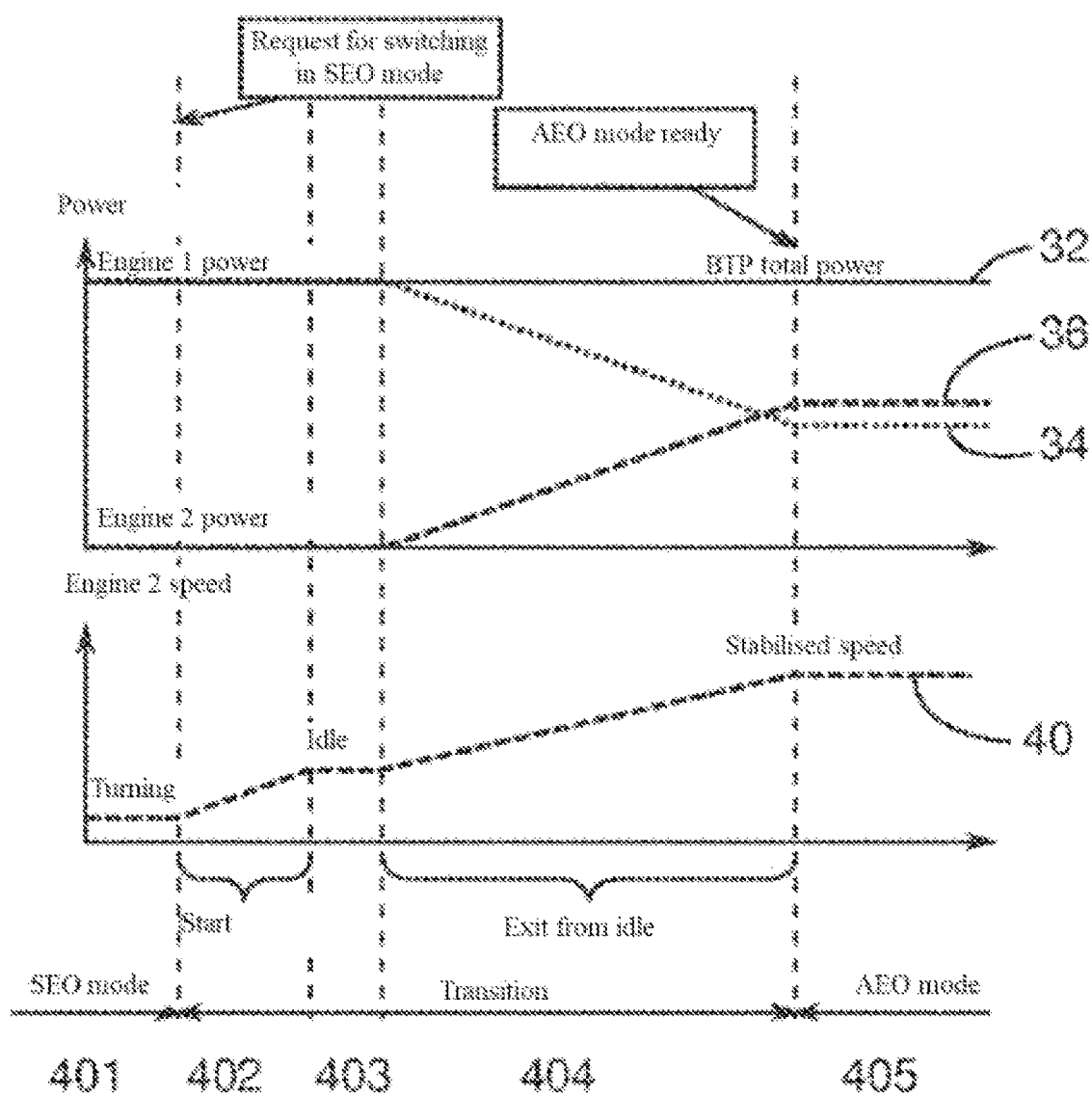
Figure 5:
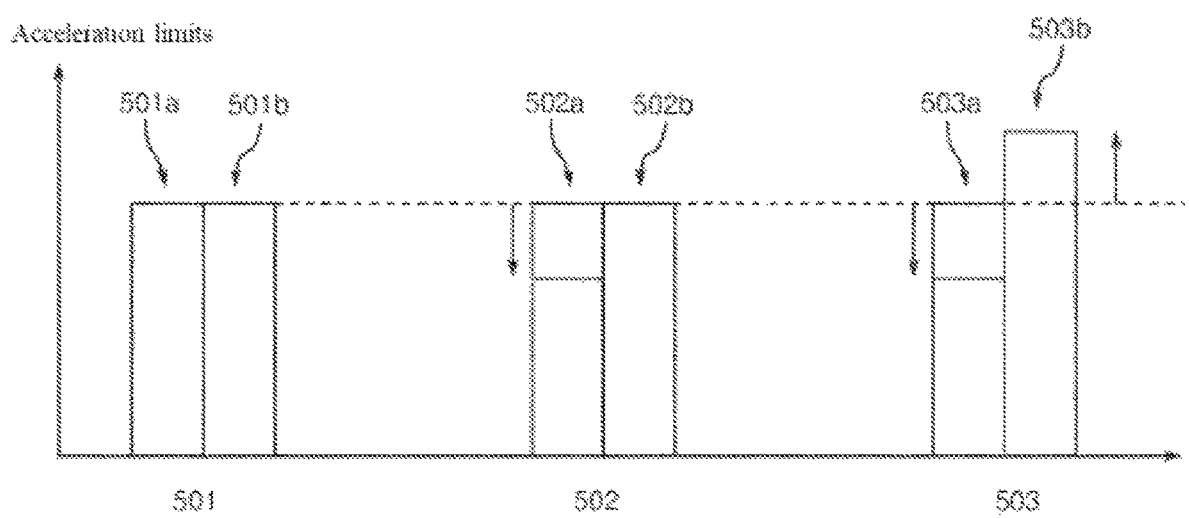
Figure 6:
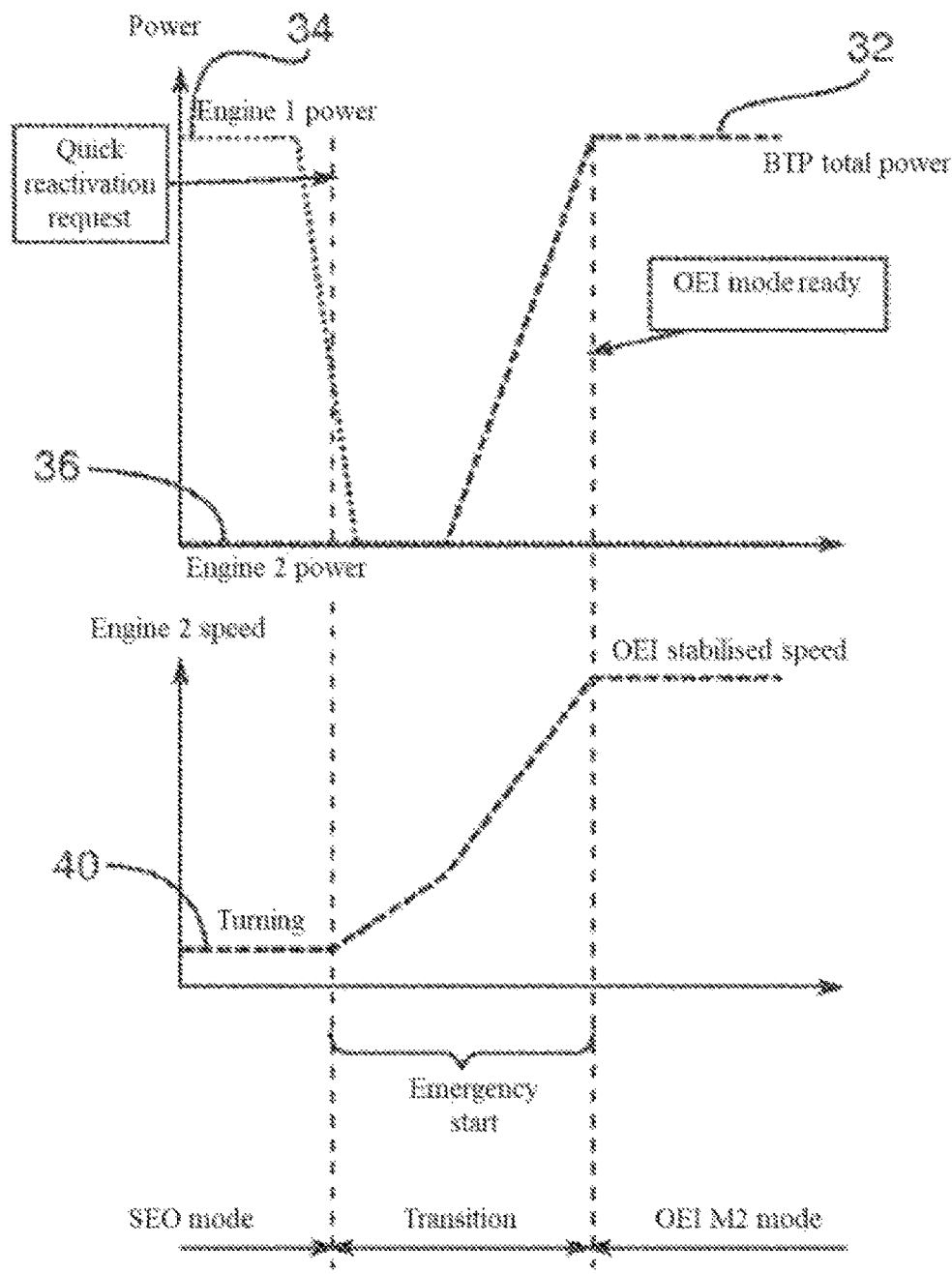

Other purposes, characteristics and advantages of the invention will appear when reading the following description given only as a non-limitative description and which refers to the annexed figures in which:

FIG. 1a is a schematic view of a propulsion system according to an embodiment of the invention, FIG. 1b is a schematic view of a propulsion system according to another embodiment of the invention, FIG. 2 is a graph representing the total power of the main gearbox, the power of the first turboshaft engine and the power of the second turboshaft engine as a function of time in a first phase of operation of a propulsion system according to an embodiment of the invention, FIG. 3 is a graph representing the total power of the main gearbox, the power of the first turboshaft engine and the power of the second turboshaft engine as a function of time in a second phase of operation of a propulsion system according to an embodiment of the invention, FIG. 4 is a graph representing the total power of the main gearbox, the power of the first turboshaft engine and the power of the second turboshaft engine as a function of time in a third phase of operation of a propulsion system according to an embodiment of the invention, FIG. 5 is a graph representing the acceleration limits of the first and second turboshaft engines according to the prior art and according to a propulsion system according to two embodiments of the invention, FIG. 6 is a graph representing the total power of the main gearbox, the power of the first turboshaft engine and the power of the second turboshaft engine as a function of time in a first failure mode of a propulsion system according to an embodiment of the invention, FIG. 7 is a graph representing the total power of the main gearbox, the power of the first turboshaft engine and the power of the second turboshaft engine as a function of time in a second failure mode of a propulsion system according to an embodiment of the invention.

6. DETAILED DESCRIPTION OF AN EMBODIMENT OF THE INVENTION

The following embodiments are examples. Although the description refers to one or more embodiments, this does not necessarily mean that each reference concerns the same embodiment, or that the characteristics apply only to one embodiment. Simple characteristics of different embodiment can also be combined to provide other embodiment. On the figures, scales and proportions are not strictly adhered to for purposes of illustration and clarity.

FIG. 1a schematically represents a propulsion system 10 according to an embodiment of the invention used for the propulsion of an aircraft, for example a helicopter. FIGS. 2, 3, 4, 6 and 7 graphically represent different phases of operation of such a propulsion system.

The propulsion system 10 comprises, in a known manner, a main gearbox 12 and at least two turboshaft engines connected to the main gearbox 12, in this case two turboshaft engines, respectively a first turboshaft engine 14a and a second turboshaft engine 14b. In a helicopter, the main gearbox is connected in particular to the main rotor, driving it in rotation which ensures the propulsion of the helicopter, and to the tail rotor for the control in yaw of the apparatus.

Each turboshaft engine comprises in a known manner a gas generator consisting of a compressor (referenced respectively 16a for the first turboshaft engine 14a and 16b for the second turboshaft engine 14b) and a turbine (referenced respectively 18a for the first turboshaft engine 14a and 18b for the second turboshaft engine 14b) connected by a shaft (referenced respectively 20a for the first turboshaft engine 14a and 20b for the second turboshaft engine 14b), and a combustion chamber (referenced respectively 22a for the first turboshaft engine 14a and 22b for the second turboshaft engine 14b) receiving air compressed by the compressor and burning an air/fuel mixture to form a gas transmitted to the turbine of the gas generator. Each turboshaft engine also comprises a free turbine (referenced respectively 24a for the first turboshaft engine 14a and 24b for the second turboshaft engine 14b) driven in rotation by the gas generator and integral with an output shaft (referenced respectively 26a for the first turboshaft engine 14a and 26b for the second turboshaft engine 14b), said output shaft being connected to the main gearbox 12. Each turboshaft engine also comprises an exhaust nozzle. At the outlet of the free turbine, the exhaust gases are discharged through the exhaust nozzle.

The propulsion system 10 also comprises at least one computer, preferably one dedicated to each turboshaft engine, here a first computer 28a connected to the first turboshaft engine 14a and a second computer 28b connected to the second turboshaft engine 14b, configured to control the two turboshaft engines, in particular to determine the energy that each turboshaft engine must provide according to the energy required for the operation of the propulsion system 10. The computers 28a and 28b can be linked together by a digital link to exchange data in the event of cooperative operation of the two turboshaft engines.

The propulsion system 10 according to an embodiment of the invention differs from known propulsion systems in that the first turboshaft engine 14a comprises a heat exchanger 30 allowing recovery of part of the thermal energy from the exhaust gases downstream of the free turbine of the first turboshaft engine. The heat exchanger 30 can thus be arranged at the exhaust nozzle of the first turboshaft engine, where part of the exhaust gases can be taken from the nozzle to supply the heat exchanger 30.

In another embodiment, shown in FIG. 1b, the heat exchanger 30 recovers part of the thermal energy of the two turboshaft engines. In other words, heat exchanger 30 is arranged to recover part of the thermal energy from the exhaust gases downstream of the free turbine of the first turbo-shaft engine 14a and part of the thermal energy from the exhaust gases downstream of the free turbine of the second turboshaft engine 14b. The heat exchanger 30 can be located at the exhaust nozzle of the first turboshaft engine 14a and in the vicinity of the exhaust nozzle of the second turboshaft engine 14b.

The heat exchanger heats the gases compressed by the compressor 16a before entering the combustion chamber 22a. This heating of the compressed gases improves the efficiency of combustion in the combustion chamber 22a and thus the overall efficiency of the first turboshaft engine 14a.

However, as explained previously, the heat exchanger is sensitive to sudden variations due to flight transient regimes in which the propulsive energy required varies greatly. The first computer 28a is thus configured to limit the acceleration and deceleration of the first turboshaft engine 14a in order to allow the heat exchanger 30 to be used without degradation.

On the other hand, the second turboshaft engine 14b is a "normal" turboshaft engine in that it does not comprise a heat exchanger. Thus, the computer 28b of the second turboshaft engine 14b has less restrictive acceleration limits than the first turboshaft engine 14a. The second turboshaft engine 14b thus ensures the transient energy requirements, as for example visible in FIG. 2 representing by a graph the total power (referenced curve 32) of the main gearbox, the power of the first turboshaft engine (referenced curve 34) and the power of the second turboshaft engine (referenced curve 36) as a function of time in a first phase of operation of a propulsion system according to an embodiment of the invention.

In a first step 201, the total power delivered by the main gearbox 12 is the sum of the two powers delivered by the turboshaft engines. In a second step 202, the propulsive energy requirements increase: the two turboshaft engines will therefore accelerate to provide more energy: their power output increases, as does the total power. Due to the limitation by the first computer 28a, the power delivered by the first turboshaft engine 14a increases slowly, and the power delivered by the second turboshaft engine increases more rapidly, so that the total power required is reached quickly. At the end of the second step, the total required power is reached. In the third step 203, the first turboshaft engine 14a continues to accelerate until it reaches a predetermined level, so that the turboshaft engines deliver similar power. Thus, in order to remain at a constant total power level, the second turboshaft engine 14b decelerates, until a fourth step 204 where the power delivered by the turboshaft engines is constant.

In the case of a reduction in the required propulsive energy, the operation is similar: in a fifth step 205, both turboshaft engines reduce the power delivered, the deceleration of the first turboshaft engine 14a being limited; in a sixth step 206, at constant total power, the first turboshaft engine 14a continues to decelerate while the second turboshaft engine accelerates, and in a seventh step 207, the powers delivered are constant.

The accelerations and decelerations of the second turboshaft engine 14b must compensate for the limitations of the first turboshaft engine 14a. To assist the second turboshaft engine, the propulsion system can comprise an electric motor 38, visible on FIG. 1a, connected to the shaft of the gas generator so as to be able to accelerate or decelerate the second turboshaft engine.

According to another embodiment not represented, the electric motor is not present, in particular if the second turboshaft engine 14b is able to ensure itself the accelerations and decelerations.

FIG. 3 is a graph representing the total power of the main gearbox, the power of the first turboshaft engine and the power of the second turboshaft engine as a function of time in a second phase of operation of a propulsion system according to an embodiment of the invention. The curves are referenced respectively 32, 34 and 36 as in FIG. 2.

This graph corresponds to a standby method of the second turboshaft engine, in which the combustion chamber 22b of the second turboshaft engine 14b is switched off and the shaft 20b of the gas generator is put in "turning" mode, i.e. driven in slow rotation by the electric motor 38. The graph also shows the speed of the second turboshaft engine as a function of time.

In particular, starting from an initial step 301 in which both turboshaft engines are in operation (AEO mode), the method comprises an idling step 302 in which the speed of the second turboshaft engine is reduced, as well as its power output. The first turboshaft engine is accelerated to compensate for this loss of power so that the total power is constant (the acceleration remains limited by the computer). An idle step 303 is reached when the second turboshaft engine no longer delivers power. A step 304 of shutdown further reduces the speed by shutting down the combustion chamber, until reaching in the final step 305 a turning mode speed in which the second turboshaft engine is driven only by the electric motor until its standby exit. The total power is delivered only by the first turboshaft engine, so the propulsion system is in SEO mode.

In a method according to another embodiment not shown, the turboshaft engine can then be switched off by stopping the rotation of the gas generator shaft until it reaches zero rpm.

FIG. 4 is a graph representing the total power of the main gearbox, the power of the first turboshaft engine and the power of the second turboshaft engine as a function of time in a third phase of operation of a propulsion system according to an embodiment of the invention. The curves are referenced respectively 32, 34 and 36 as in FIGS. 2 and 3.

This graph corresponds to a standby exit method of the second turboshaft engine. The graph also represents the speed 40 of the second turboshaft engine as a function of time. It thus corresponds to a phase inverse to that of FIG. 3, in particular:
- the initial step 401 corresponds to the second turboshaft engine in standby and the first turboshaft engine delivering all the power of the propulsion system. The step corresponds to the situation of step 305 in FIG. 3;
- the starting step 402 corresponds to the ignition of the combustion chamber of the second turboshaft engine, until reaching an idle level;
- the idling step 403 corresponds to the second turboshaft engine at idle, without power supply;
- the idle output step 404 corresponds to an acceleration of the second turboshaft engine and a limited deceleration of the first turboshaft engine;
- step 405 in which both turbo-shaft engines are functional (AEO mode), corresponding to the initial state 301 in FIG. 3.

FIG. 5 is a graph representing the acceleration limits of the first and second turboshaft engines according to the prior art and according to a propulsion system according to two embodiments of the invention.

In the first curve 501 representing the prior art, the acceleration limits of the two turboshaft engines (501a for the first turboshaft engine and 501b for the second turboshaft engine) are equal: these two turboshaft engines are identical. The acceleration limits are mainly physical limits of the turboshaft engines.

The second curve 502 represents a first embodiment of the invention, in which the first turboshaft engine comprises the exchanger and is limited in acceleration (see curve 502a), and the second turboshaft engine is "classic", i.e. without an electric assistance motor (see curve 502b). The second turboshaft engine has an acceleration limit equal to the previous art, and the first turboshaft engine has a lower threshold due to the limitation by its computer. However, as shown in the hatched area, the first turboshaft engine can regain its "classic" acceleration by unbridling it in an emergency situation when the second turboshaft engine fails (see description in FIG. 7 below).

The third curve 503 represents a second embodiment of the invention, in which the first turboshaft engine comprises the exchanger and is limited in acceleration (see curve 503a), and the second turboshaft engine is assisted by an electric motor: the acceleration limit of the second turboshaft engine is then higher than that of a conventional turboshaft engine thanks to the assistance of the electric motor (see curve 503b). As for the embodiment, as shown in the hatched area, the first turboshaft engine can regain its "conventional" acceleration by unbridling it in an emergency situation when the second turboshaft engine fails (see description in FIG. 7 below).

FIG. 6 is a graph representing the total power of the main gearbox, the power of the first turboshaft engine and the power of the second turboshaft engine as a function of time in a first failure mode of a propulsion system according to an embodiment of the invention. The curves are referenced respectively 32, 34 and 36 as in FIGS. 2, 3 and 4. FIG. 6 also represents the speed of the second turboshaft engine during this failure mode.

This first failure mode corresponds to a failure of the first turboshaft engine in an SEO operating mode as described in reference to FIGS. 3 and 4, i.e. only the first turboshaft engine was providing propulsive power at the time of the failure.

As soon as the loss of the first turboshaft engine is detected, a quick reactivation command is sent to the second turboshaft engine. The second turboshaft engine is thus strongly accelerated until it reaches a power level equal to the power previously delivered by the first turboshaft engine before its failure. The second turboshaft engine thus delivers the full power of the main gearbox. This operating mode is called OEI mode for One Engine Inoperative.

The rapid reactivation can for example be carried out with the assistance of the electric motor, e.g. powered for emergency power sources such as super-capacitor, thermal battery, batteries, etc., see patent applications WO2015145042 and WO2015145031. In the absence of the electric motor, rapid reactivation can also be carried out e.g. by means of a suitable pyrotechnic device, as for example described in application WO2013160590.

FIG. 7 is a graph representing the total power of the main gearbox, the power of the first turboshaft engine and the power of the second turboshaft engine as a function of time in a second failure mode of a propulsion system according to an embodiment of the invention. The curves are referenced respectively 32, 34 and 36 as in FIGS. 2, 3, 4 and 6. FIG. 7 also represents the speed of the first turboshaft engine during this failure mode.

This second failure mode corresponds to a failure of the second turboshaft engine in an AEO operating mode as described in reference to FIG. 2, i.e. both turboshaft engines were providing propulsive power to the main gearbox at the time of the failure.

In the event of a failure of the second turboshaft engine, the first turboshaft engine must provide the total power requirements of the main gearbox alone. Thus, it must accelerate to deliver the necessary power to compensate for the loss of the second turboshaft engine. However, the acceleration of the second turboshaft engine is normally limited by the computer. In an emergency situation such as this one, since a turboshaft engine has failed, the first computer 28a will lift the acceleration/deceleration limitation of the first turboshaft engine so that it can deliver the necessary power quickly so as not to endanger the aircraft and its occupants. The exchanger will thus be susceptible to more rapid damage due to the rapid variation in power delivered (and temperature).

In SEO mode, if the second turboshaft engine is on standby and fails, the first turboshaft engine is already delivering full power. However, if the power requirements increase, the first turboshaft engine will have to meet these requirements and thus the computer will also be able to lift the acceleration limitation if necessary.

The invention is not limited to the described embodiments. In particular, the invention also concerns multi-engine propulsion systems having more than two turboshaft engines.

Such a propulsion system comprises a main gearbox and at least three turboshaft engines connected to the main gearbox. Each turboshaft engine may comprise a free turbine.

At least one of the turboshaft engines comprises a heat exchanger configured to recover part of the thermal energy from the exhaust gases leaving the free turbine.

An electric motor may be connected to at least one other of the turboshaft engines and be configured to assist this turboshaft engine during an acceleration, starting and/or standby exit phase.

The propulsion system comprises at least one computer, configured to control the turboshaft engines and to limit the acceleration and deceleration of the turboshaft engine comprising the heat exchanger when none of the turboshaft engines has failed, so as to limit power transients at the heat exchanger.

In other words, the propulsion system comprises a first and a second turboshaft engine as described above, as well as other turboshaft engines that can be either with an exchanger and limited acceleration (like the first turboshaft engine) or without an exchanger and with or without an electric assist motor (like the second turboshaft engine).

The invention claimed is:

1. A propulsion system of an aircraft, comprising a main gearbox and at least two turboshaft engines connected to the main gearbox, respectively a first turboshaft engine and a second turboshaft engine, each turboshaft engine comprising a gas generator comprising a compressor and a turbine connected by a shaft, a combustion chamber receiving air compressed by the compressor and burning an air/fuel mixture to form a gas transmitted to the turbine of the gas generator, and a free turbine driven in rotation by the gas generator and integral with an output shaft, said output shaft being connected to the main gearbox, wherein the first turboshaft engine comprises a heat exchanger configured to recover part of the thermal energy from the exhaust gases exiting at least the free turbine of the first turboshaft engine and to heat the air compressed by the compressor of the first turboshaft engine via the recovered thermal energy portion, wherein the propulsion system comprises at least one computer, configured to control the two turboshaft engines and to limit the acceleration and deceleration of the first turboshaft engine when neither of the turbo shaft engines is broken down, so as to limit the power transients at the heat exchanger, and in that the acceleration and deceleration limits imposed by the computer on the first turboshaft engine, when none of the turboshaft engines has failed, are predefined in relation to the heat exchanger so as to limit the thermal and mechanical stresses in the heat exchanger;

wherein the second turboshaft engine is not equipped with a heat exchanger configured to recover thermal energy from the exhaust gases produced by the second turboshaft engine.

2. The propulsion system according to claim 1, wherein the acceleration and deceleration limits are predefined as a function of the dimensioning and mechanical strength of the heat exchanger.

3. The propulsion system according to claim 1, wherein the acceleration and deceleration limits are predefined as a function of the heat exchanger and are lower than the physical acceleration and deceleration limits of the first turboshaft engine, and the heat exchanger is unable to withstand without degradation the power transients corresponding to said physical limits.

4. The propulsion system according to claim 1, wherein the computer imposes on the first turboshaft engine acceleration and deceleration stops corresponding to physical acceleration and deceleration limits of the first turboshaft engine beyond which the turboshaft engine is susceptible to pumping or flameout, and the acceleration and deceleration limits for limiting the power transients at the heat exchanger are less than said acceleration and deceleration stops.

5. The propulsion system according to claim 1, wherein it comprises an electric motor connected to the second turboshaft engine and configured to assist the second turboshaft engine during an acceleration, starting and/or standby exit phase.

6. The propulsion system according to claim 1, wherein each turboshaft engine comprises an exhaust nozzle, the heat exchanger being configured to recover part of the thermal energy from the exhaust gases at the exhaust nozzle of the first turboshaft engine.

7. The propulsion system according to claim 1, wherein the heat exchanger is configured to recover part of the thermal energy from the exhaust gases of both turboshaft engines.

8. The propulsion system according to claim 1, wherein the at least two turboshaft engines comprise N turboshaft engines connected to the main gearbox, N being an integer greater than or equal to 3, each turboshaft engine comprising a free turbine, and in that the computer is configured to control the N turboshaft engines and to limit the acceleration and deceleration of said first turboshaft engine when none of the N turboshaft engines is broken down, so as to limit the power transients at the heat exchanger.

9. The propulsion system according to claim 8, wherein it comprises an electric motor connected to at least one other turboshaft engine, referred to as the second turboshaft engine, and configured to assist said second turboshaft engine during an acceleration, starting and/or standby exit phase.

10. A method for managing a propulsion system according to claim 1, wherein the method comprises the following steps:
- a step of controlling the energy supplied by the first turboshaft engine and the second turboshaft engine so as to ensure the propulsive energy requirements,
- during a cruise flight of the aircraft, a step of shutdown or standby of the second turboshaft engine, so that the first turboshaft engine provides all the propulsive energy,
- a restart or standby exit step of the second turboshaft engine if it is shut down or in standby and the energy supplied by the first turboshaft engine is no longer sufficient to meet the propulsive energy requirements.

11. The management method according to claim 10, wherein the restart or standby exit step comprises a step of assistance by an electric motor connected to the second turboshaft engine.

* * * * *